US012587389B2

(12) United States Patent
Chodroff et al.

(10) Patent No.: US 12,587,389 B2
(45) Date of Patent: Mar. 24, 2026

(54) QUANTUM RESISTANT IDENTITY SHARING SYSTEM

(71) Applicant: HSBC SOFTWARE DEVELOPMENT (GUANGDONG) LIMITED, Guangzhou (CN)

(72) Inventors: Benjamin Chodroff, Shanghai (CN); Yong Xia, Shanghai (CN); Muyun Dong, Singapore (SG); Kelvin T. H. Chow, Hong Kong (CN)

(73) Assignee: HSBC SOFTWARE DEVELOPMENT (GUANGDONG) LIMITED, Guangzhou (CN)

( * ) Notice: Subject to any disclaimer, the term of this patent is extended or adjusted under 35 U.S.C. 154(b) by 147 days.

(21) Appl. No.: 18/404,368

(22) Filed: Jan. 4, 2024

(65) Prior Publication Data

US 2024/0430105 A1      Dec. 26, 2024

(51) Int. Cl.
*H04L 29/06*        (2006.01)
*H04L 9/32*         (2006.01)

(52) U.S. Cl.
CPC .......... H04L 9/3263 (2013.01); H04L 9/3213 (2013.01)

(58) Field of Classification Search
CPC ... H04L 9/3263; H04L 9/3213; H04L 9/3247; H04L 9/50; H04L 9/3242; H04L 9/0643; H04L 9/3236; H04L 63/123; H04L 9/3239
See application file for complete search history.

(56) References Cited

U.S. PATENT DOCUMENTS

| | | | |
|---|---|---|---|
| 11,405,189 B1 | 8/2022 | Bennison | |
| 2017/0048216 A1* | 2/2017 | Chow | G06Q 20/401 |
| 2019/0356493 A1* | 11/2019 | Fisher | H04L 63/102 |
| 2020/0280444 A1* | 9/2020 | Tang | H04L 9/3247 |
| 2022/0092161 A1 | 3/2022 | Keith, Jr. | |
| 2022/0156456 A1* | 5/2022 | Gadiya | G06V 30/418 |
| 2022/0200796 A1* | 6/2022 | Robison | G06F 9/45558 |

* cited by examiner

*Primary Examiner* — Yogesh Paliwal
(74) *Attorney, Agent, or Firm* — DENTONS Durham Jones Pinegar

(57)                ABSTRACT

A computing system receives a request from a client device to verify a document associated with a user of the client device. The request includes an identity token of the user and the document to be verified. The computing system generates a hash value corresponding to the document using a public key. The computing system identifies a plurality of previously generated hash values linked to the identity token. Each of the plurality of previously generated hash values were generated using the public key by a second computing system distinct from the computing system. The computing system compares the generated hash value to the plurality of previously generated hash values. The computing system determines that the generated hash value matches at least one of the previously generated hash values. Based on the determining, the computing system confirms that the document is authentic.

14 Claims, 7 Drawing Sheets

600

100

Primary Computing System 104

Repository 202

204

204

204

Token Generator 118

Encryption Module 310

Public Key 312

Tokenization Module 206

Broadcast Module 208

Blockchain 130

Client Device 102

Wallet 112

Local Storage 114

Encrypted PII 314

400

500

600

QUANTUM RESISTANT IDENTITY SHARING SYSTEM

FIELD OF THE DISCLOSURE

Embodiments disclosed herein generally relate to a system and method for sharing identification information using quantum resistant algorithms.

BACKGROUND

Verifying users to entities can be a time-consuming process. If a user is seeking verification with more than one entity, such as various different jurisdictions, the user may be faced with a long and tedious process for authenticating documents and providing those authenticated documents to the various entities.

SUMMARY

In some embodiments, a method is disclosed herein. A computing system receives a request from a client device to verify a document associated with a user of the client device. The request includes an identity token of the user and the document to be verified. The computing system generates a hash value corresponding to the document using a public key. The computing system identifies a plurality of previously generated hash values linked to the identity token. Each of the plurality of previously generated hash values were generated using the public key by a second computing system distinct from the computing system. The computing system compares the generated hash value to the plurality of previously generated hash values. The computing system determines that the generated hash value matches at least one of the previously generated hash values. Based on the determining, the computing system confirms that the document is authentic.

In some embodiments, a non-transitory computer readable medium is disclosed herein. The non-transitory computer readable medium includes one or more sequences of instructions, which, when executed by a processor, causes a computing system to perform operations. The operations include receiving, by the computing system, a request from a client device to verify a document associated with a user of the client device. The request includes an identity token of the user and the document to be verified. The operations further include generating, by the computing system, a hash value corresponding to the document using a public key. The operations further include identifying, by the computing system, a plurality of previously generated hash values linked to the identity token. Each of the plurality of previously generated hash values were generated using the public key by a second computing system distinct from the computing system. The operations further include comparing, by the computing system, the generated hash value to the plurality of previously generated hash values. The operations further include determining, by the computing system, that the generated hash value matches at least one of the previously generated hash values. The operations further include based on the determining, confirming, by the computing system, that the document is authentic.

In some embodiments, a system is disclosed herein. The system includes a processor and a memory. The memory has programming instructions stored thereon, which, when executed by the processor, causes the system to perform operations. The operations include receiving a request from a client device to verify a document associated with a user of the client device. The request includes an identity token of the user and the document to be verified. The operations further include generating a hash value corresponding to the document using a public key. The operations further include identifying a plurality of previously generated hash values linked to the identity token. Each of the plurality of previously generated hash values were generated using the public key by a second computing system distinct from the computing system. The operations further include comparing the generated hash value to the plurality of previously generated hash values. The operations further include determining that the generated hash value matches at least one of the previously generated hash values. The operations further include based on the determining, confirming that the document is authentic.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Sharing personal identifiable information (PII) between with an entity for purposes of verification can be a challenging and tedious process. Individuals typically have to provide identity verifying entities with a pre-defined amount of information that provides the identity verifying entities with enough proof that the person they are verifying are who they hold themselves out to be. When users or individuals move across borders or jurisdictions, there may be various regulatory, compliance, and security challenges to re-verifying their identities in that jurisdiction. For example, banking customers that move from one country to another country are often required to re-submit similar sets of information for the purpose of account opening, credit card application, mortgage application, and the like. Such process can be time consuming and tedious, especially when the customer previously submitted the requested information in their original jurisdiction.

One or more techniques described herein improves upon the identification verification process by leveraging the decentralized nature of a blockchain ledger. For example, one or more techniques described may utilize a combination of identity tokens and hashes that may be stored on the blockchain and used to verify or authenticate an individual across jurisdictions.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
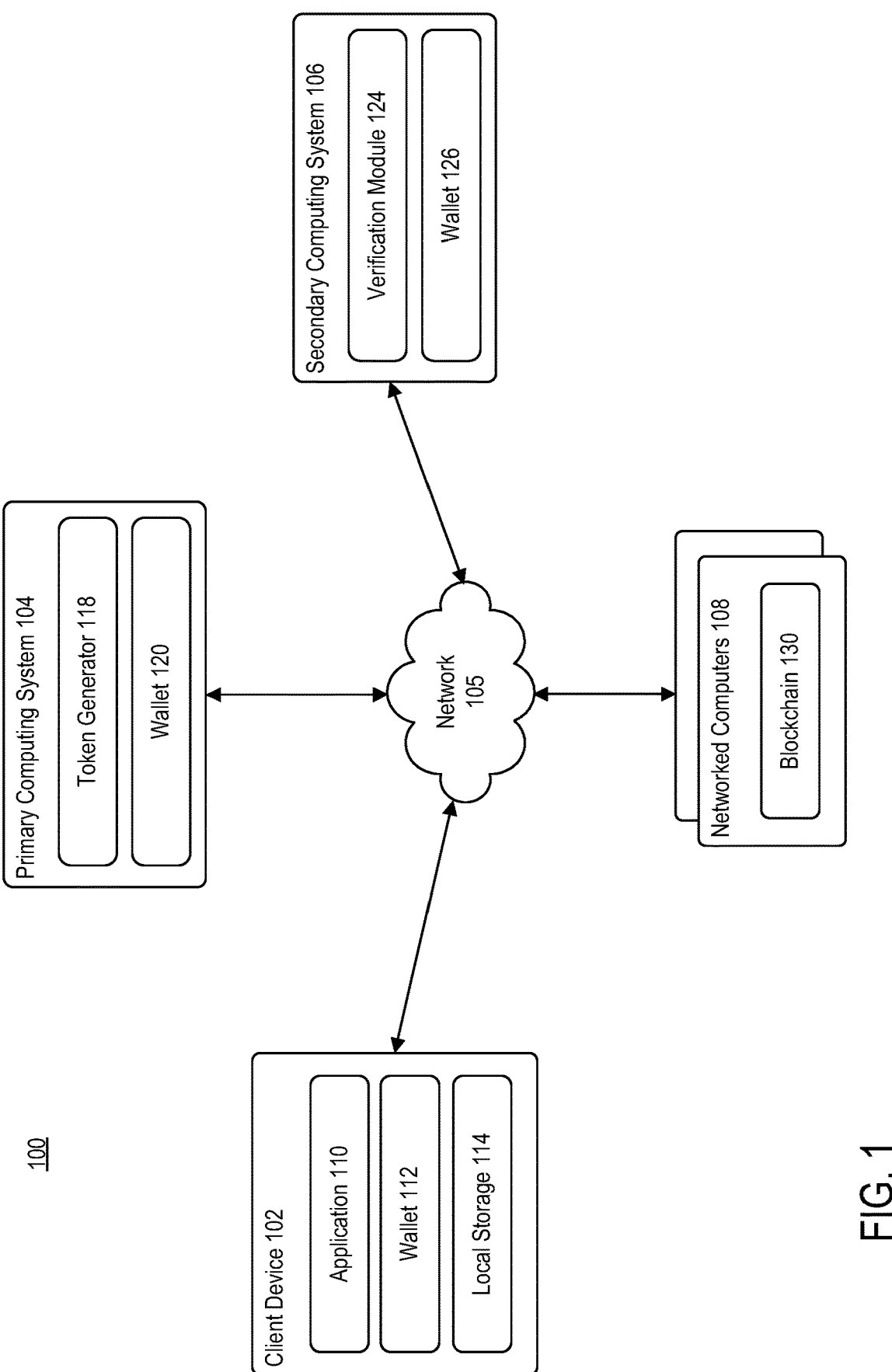
FIG. 1 is a block diagram illustrating a computing environment, according to example embodiments.

FIG. 1 is a block diagram illustrating a computing environment 100, according to one embodiment. Computing environment 100 may include at least a client device 102, a primary computing system 104, a secondary computing system 106, and one or more networked computers 108 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, Zig-Bee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of computing environment 100.

Client device 102 may be operated by a user. Exemplary users may include, but are not limited to, individuals seeking to have their identity verified or documents verified. For example, an exemplary user may be a banking customer seeking a mortgage or other loan. In another example, an exemplary user may be a student applying to a college or university. In some embodiments, client device 102 may be representative of one or more computing devices, such as, but not limited to, a mobile device, a tablet, a personal computer, a laptop, a desktop computer, or, more generally, any computing device or system having the capabilities described herein.

Client device 102 may include application 110, wallet 112, and local storage 114. Application 110 may be associated with at least primary computing system 104. In some embodiments, application 110 may also be associated with secondary computing system 106, as discussed in more detail below. In some embodiments, application 110 may be a standalone application associated with at least primary computing system 104. In some embodiments, application 110 may be representative of a web-browser configured to communicate with primary computing system 104.

In some embodiments, client device 102 may be configured to execute application 110 to access content managed by primary computing system 104. For example, via application 110, a user may upload documents for verifying the individual's identity or for receiving validation for documents uploaded by the user. The content that is displayed to the user via client device 102 may be transmitted from a web client application server of primary computing system 104 to client device 102, and subsequently processed by application 110 for display through a graphical user interface (GUI).

Wallet 112 may be configured to store a user's fungible tokens (e.g., cryptocurrency) and non-fungible tokens in an encrypted manner. In some embodiments, wallet 112 may be representative of a hot wallet, which is a cryptographic wallet connected to a network, such as network 105. In some embodiments, wallet 112 may be representative of a cold wallet, which is not connected to a network.

As discussed in more detail below, wallet 112 may be configured to store an identity token associated with a user of client device 102. In some embodiments, primary computing system 104 may generate the identity token for the user and may transfer the generated identity token from a wallet associated with primary computing system 104 to wallet 112. The user's identity token may be utilized to uniquely identify the user. In some embodiments, the identity token may include a private key associated therewith. Using the private key, a user of client device 102 may, for example, sign a transaction, which can show a third party that the identity token is uniquely associated with the user.

Local storage 114 may be representative of any local storage associated with client device 102. In some embodiments, local storage 114 may be configured to store the user's identity token and other documents that may be associated with the user. For example, in some embodiments, a user may upload certain information to primary computing system 104 in order to verify their identity. Exemplary information may include, but is not limited to, a utility bill, a lease, a driver's license, a passport, a student identification, and the like. Client device 102 may store a copy of the information in local storage 114 for subsequent retrieval. Because the user's information is sensitive in nature, the user may sign the documents using their private key. In some embodiments, the private key may be a quantum resistant algorithm. For example, the private key may utilize CRSYALS-Dilithium algorithm.

In some embodiments, the user may further store information provided by primary computing system 104 in local storage 114. For example, the user may download a banking statement from primary computing system 104 using application 110. Client device 102 may sign the banking statement using the private key and may store the signed banking statement in local storage 114.

Primary computing system 104 may be representative of an organization or agency associated with a user of client device 102. For example, in some embodiments, primary computing system 104 may be an identity verification service. In another example, primary computing system 104 may be a financial institution.

As shown, primary computing system 104 may include token generator 118 and wallet 120. Token generator 118 may be comprised one or more software modules. The one or more software modules are collections of code or instructions stored on a media (e.g., memory of primary computing system 104) that represent a series of machine instructions (e.g., program code) that implements one or more algorithmic steps. Such machine instructions may be the actual computer code the processor of primary computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Wallet 120 may be configured similarly to wallet 112. For example, wallet 120 may be configured to store a user's fungible tokens (e.g., cryptocurrency) and non-fungible tokens in an encrypted manner. In some embodiments, wallet 120 may be representative of a hot wallet, which is a cryptographic wallet connected to a network, such as network 105. In some embodiments, wallet 120 may be representative of a cold wallet, which is not connected to a network.

Wallet 120 may further be configured to store a private key or hash algorithm associated with primary computing system 104. The private key or hash algorithm may be used by primary computing system 104 to hash certain information provided by an end user prior to broadcasting the output hash value to blockchain 130.

In some embodiments, token generator 118 may be configured to generate an identity token for each user associated therewith. For example, token generator 118 may generate a non-fungible token that uniquely identifies the user. Token generator 118 may broadcast the identity token to blockchain 130. Once a user's identity token is generated, primary computing system 104 may transfer the user's identity token from wallet 120, that is associated with primary computing system 104, to wallet 112 associated with the user. In some embodiments, the identity token may be a non-fungible token representative of an ERC721 contract. In some embodiments, the identity token may be a non-fungible token representative of an ERC1155 contract.

In some embodiments, token generator 118 may further be configured to hash documents associated with each user. For example, during the identity verification process, user of client device 102 may upload their personal identification information. Token generator 118 may be configured to hash each item of personal identification information using the stored hash algorithm or private key and broadcast the hash value to blockchain 130. In some embodiments, token generator 118 may further link each hash value to the user's corresponding identity token. In this manner, when the user provides their identity token to another entity (such as secondary computing system 106), the other entity can identify the hash values linked to the identity token.

In some embodiments, token generator 118 may further be configured to hash other documents associated with the user. For example, in those embodiments in which primary computing system 104 is a financial institution, token generator 118 may generate a hash of a user's bank statement using the stored hash algorithm or private key. Token generator 118 may similarly broadcast the hash value of the bank statement to blockchain 130. In some embodiments, token generator 118 may further link each hash value to the user's corresponding identity token. In this manner, when the user provides their bank statement to another entity (such as secondary computing system 106), the other entity can be assured of the authenticity of the bank statement or other document.

Secondary computing system 106 may be representative of an organization or agency associated with a user of client device 102. More generally, in some embodiments, secondary computing system 106 may be representative of any entity at which the user is trying to authenticate themselves. For example, secondary computing system 106 may be a financial institution located in a jurisdiction different from primary computing system 104.

As shown, secondary computing system 106 may include verification module 124 and wallet 126. Verification module 124 may be comprised one or more software modules. The one or more software modules are collections of code or instructions stored on a media (e.g., memory of secondary computing system 106) that represent a series of machine instructions (e.g., program code) that implements one or more algorithmic steps. Such machine instructions may be the actual computer code the processor of secondary computing system 106 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Wallet 126 may be configured similarly to wallet 112 and wallet 120. For example, wallet 126 may be configured to store a user's fungible tokens (e.g., cryptocurrency) and non-fungible tokens in an encrypted manner. In some embodiments, wallet 126 may be representative of a hot wallet, which is a cryptographic wallet connected to a network, such as network 105. In some embodiments, wallet 126 may be representative of a cold wallet, which is not connected to a network.

Wallet 126 may further be configured to store a private key or hash algorithm associated with secondary computing system 106. The private key or hash algorithm may be used by primary computing system 106 to hash certain information provided by an end user in order to ensure that the provided information is authentic. The private key or hash algorithm stored in wallet 126 is the same private key or hash algorithm stored and used by primary computing system 104.

Verification module 124 may be configured to verify information provided by an individual. For example, as discussed above, the process involved in a user verifying themselves with a new entity is an involved process that involves uploading personal identification. Using a more specific example, when a user applies for a loan, they typically need to upload identification information and certain information to show their current financial situation (e.g., bank statements). When an entity receives this information, they typically need to go through the process of verifying this information is correct. For example, if the user downloads their bank statement from primary computing system 104 and provides that bank statement to secondary computing system 106, secondary computing system 106 will traditionally need to contact primary computing system 104 to confirm that the bank statement is authentic.

To verify an item of information provided by client device 102, verification module 124 may receive the identity token from client device 102. Given the identity token, verification module 124 can retrieve, from blockchain 130, all hash values linked to the identity token. As discussed above, each hash value represents a hashed output of a document previously verified by primary computing system 104. Verification module 124 may then hash the information provided by client device 102 using the hash algorithm or private key stored in wallet 126, and may compare the hash value that verification module 124 generated to the hash values retrieved from blockchain 130. Because the hash algorithm or private key used by primary computing system 104 and secondary computing system 106 is the same, if the information is authentic, there should be a matching hash value stored on blockchain 130 and linked to the user's identity token. Thus, if verification module 124 identifies a matching hash value linked to the user's identity token, secondary computing system 106 can conclude that the information is authentic.

As those skilled in the art understand, such process may be performed without requiring any communication between primary computing system 104 and secondary computing system 106. Thus, such approach satisfies the various regulatory, compliance, and security challenges related to transferring personal identification information across jurisdictions.

Networked computers 108 may be configured to host blockchain 130. In some embodiments, blockchain 130 may be a public blockchain. In some embodiments, blockchain 130 may be a private blockchain, such as, for example, a private blockchain associated with primary computing system 104 and secondary computing system 106. Generally, blockchain 130 may be representative of any blockchain configured to support non-fungible tokens. For example, blockchain 130 may be a public or private blockchain based on the Ethereum platform.

Figure 2:
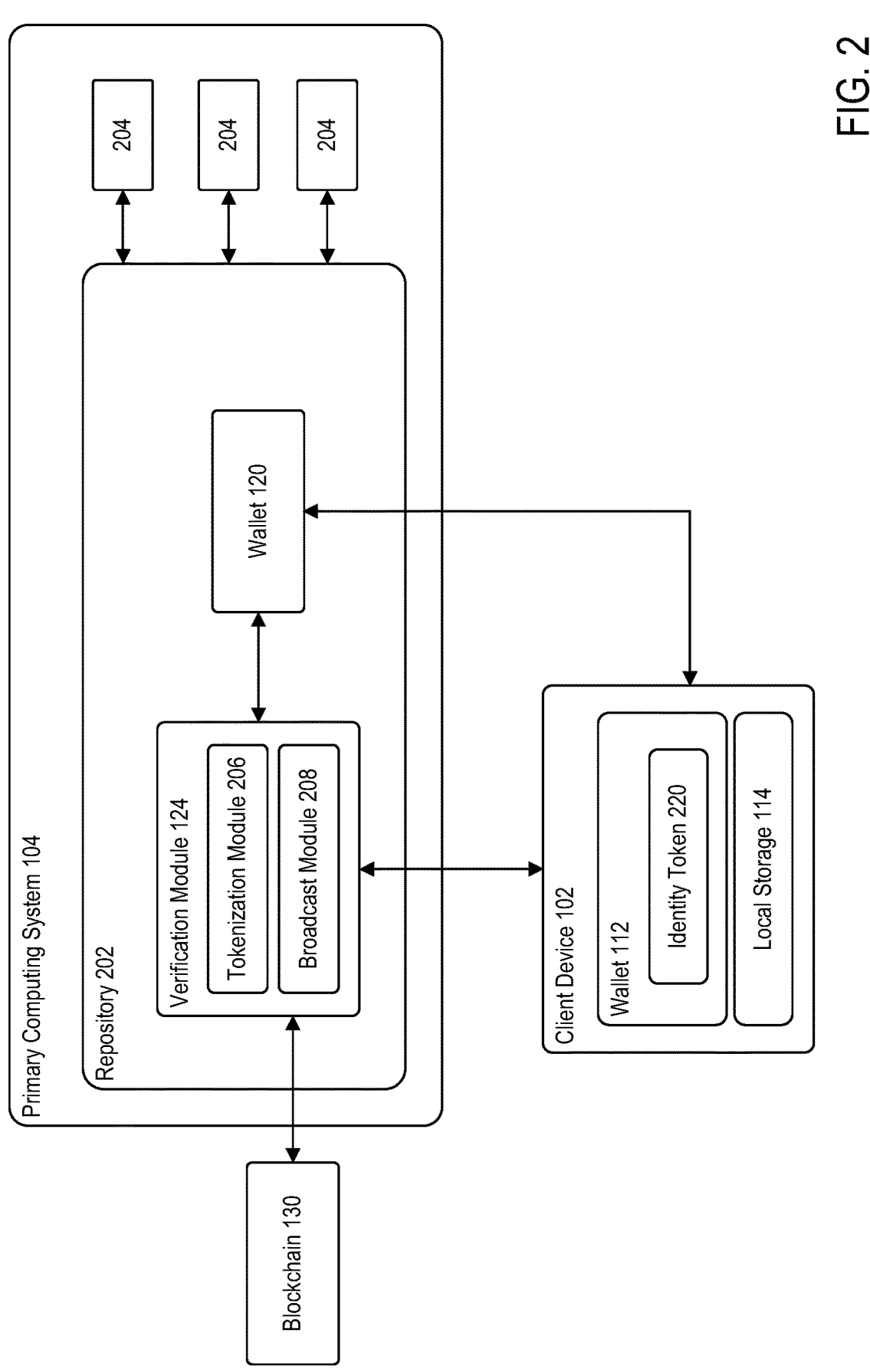
FIG. 2 is a block diagram illustrating primary computing system, according to example embodiments.

FIG. 2 is a block diagram illustrating primary computing system 104, according to example embodiments. As shown, primary computing system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least verification module 124 and wallet 120. Verification module 124 may include tokenization module 206 and broadcast module 208.

Each of tokenization module 206 and broadcast module 208 may be comprised one or more software modules. The one or more software modules are collections of code or instructions stored on a media (e.g., memory of primary computing system 104) that represent a series of machine instructions (e.g., program code) that implements one or more algorithmic steps. Such machine instructions may be the actual computer code the processor of primary computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Tokenization module 206 may be configured to generate an identity token for a user of client device 102. In some embodiments, the identity token may uniquely identify the user. Further, the identity token may prove to other entities that the user has been authenticated by primary computing system 104. In some embodiments, the identity token may be a non-fungible token. For example, the identity token may take the form of an ERC-721 or ERC-1155 contract.

Once generated, broadcast module 208 may be configured to write or broadcast the non-fungible token to blockchain 130.

As those skilled in the art understand, once tokenization module 206 generate the identity token and it is broadcast to blockchain 130, the ownership of the identity token may be initially in control of primary computing system 104. For example, primary computing system 104 may initially store the user's identity token in wallet 120. Primary computing system 104 may transfer the identity token to client device 102 through a transaction that may be written or broadcast to blockchain 130. As shown, client device 102 may store identity token 220 in wallet 112.

Figure 3:
FIG. 3 is a block diagram illustrating primary computing system, according to example embodiments.

FIG. 3 is a block diagram illustrating primary computing system 104, according to example embodiments. Similar to FIG. 2, primary computing system 104 includes repository 202 and one or more computer processors 204. In the embodiments shown in FIG. 3, token generator 118 may further include encryption module 310.

Encryption module 310 may be comprised one or more software modules. The one or more software modules are collections of code or instructions stored on a media (e.g., memory of primary computing system 104) that represent a series of machine instructions (e.g., program code) that implements one or more algorithmic steps. Such machine instructions may be the actual computer code the processor of primary computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Encryption module 310 may be configured to generate a hashed representation of documents uploaded by client device 102. For example, as discussed above, a user of client device 102 may upload certain documents as part of an onboarding process with primary computing system 104. In some embodiments, the documents may include, but are not limited to, driver's licenses, passports, utility bills, proof of address, and the like. For each document uploaded by the user of client device 102, encryption module 310 may generate a hash of the document using public key 312. In some embodiments, encryption module 310 may generate a plurality of hash values for the document. For example, encryption module 310 may generate a first hash of the entire document and a plurality of second hashes of portions of the document.

Once the hash value is generated, broadcast module 208 may broadcast the hash value to blockchain 130. In some embodiments, as part of the broadcasting operation, broadcast module 208 may further link the hash value or the storage address of the hash value to the user's identity token. In this manner, when another entity or the user pulls their identity token from blockchain 130, the identity token will indicate that there is other information stored on blockchain 130 that is associated with the user's identity token.

In some embodiments, encryption module 310 may further be configured to hash certain documents requested by a user of client device 102. For example, a user of client device 102 may request, for example, a bank statement from primary computing system 104 for providing a proof of wealth to another entity (e.g., secondary computing system 106). In such embodiments, encryption module 310 may similarly generate a hash value or a plurality of hash values of the requested document. Similarly, broadcast module 208 may, in turn, broadcast the generated hash value to blockchain 130 and may link the hash value to the user's identity token.

As shown, primary computing system 104 may then provide the requested document to client device 102. In some embodiments, client device 102 may store the various documents in local storage 114. For example, client device 102 may utilize a quantum resistant algorithm to encrypt and store the documents (shown as "encrypted PII 314) in local storage 114.

Figure 4:
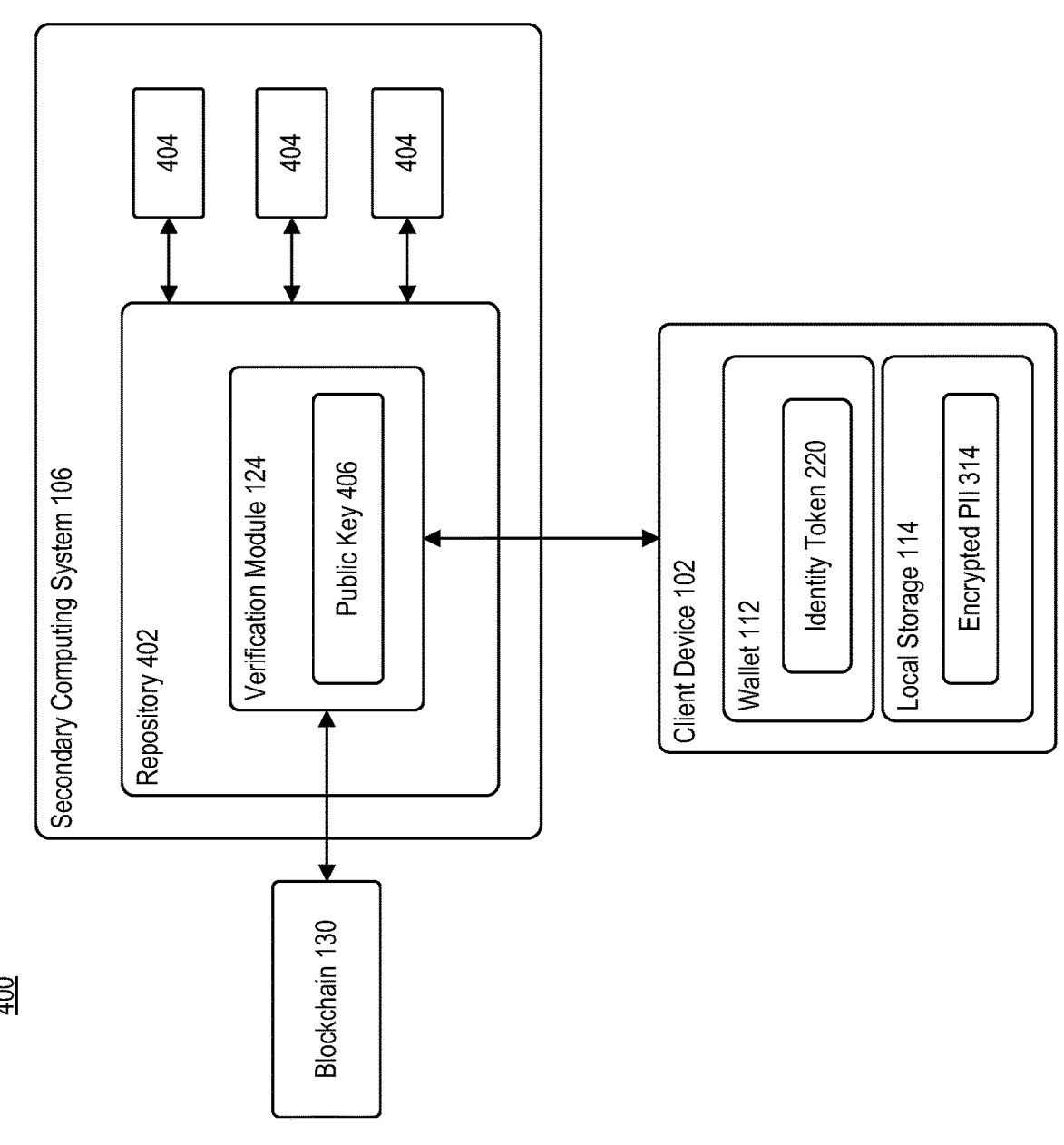
FIG. 4 is a block diagram illustrating secondary computing system, according to example embodiments.

FIG. 4 is a block diagram 400 illustrating secondary computing system 106, according to example embodiments. Secondary computing system 106 includes repository 402 and one or more computer processors 404.

Repository 402 may include verification module 124. Verification module 124 is configured to receive and process requests from client device 102. For example, secondary computing system 106 may be representative of a bank or financial institution with which the user may wish to enroll. As part of the enrollment or application process, the user will need to submit documentation that authenticates the user and provides secondary computing system 106 with the necessary information to process the user's request.

In some embodiments, the request from client device 102 to verification module 124 may include at least the user's identity token 220. In some embodiments, verification module 124 may prompt the user of client device 102 to verify that they own identity token 220. To prove to secondary computing system 106 that the user indeed owns identity token 220, the user may sign a transaction using identity token 220. Such process confirms to secondary computing system 106 that the user is associated with identity token 220.

As discussed above, identity token 220 may include certain information linked thereto. For example, identity token 220 may include a plurality of hash values that are associated with or linked to identity token 220. When verification module 124 identifies identity token 220 on blockchain 130, verification module 124 may further identify the plurality of hash values associated therewith.

In operation, a user of client device 102 may decrypt an item of encrypted PII 314 and may provide the decrypted PII to verification module 124. Verification module 124 may confirm that the PII is authentic by generating a hash value or a plurality of hash values for the PII using public key 406. Public key 406 may be the same as public key 312. Thus, when verification module 124 hashes the PII, verification module 124 should generate an output that is linked to the user's identity token. Thus, verification module 124 may compare the hash value generated by secondary computing system 106 to the hash values generated by primary computing system 104 and linked to identity token 220. If verification module 124 determines there is a match, then secondary computing system 106 may conclude that the PII provided by the user is authentic.

Figure 5:
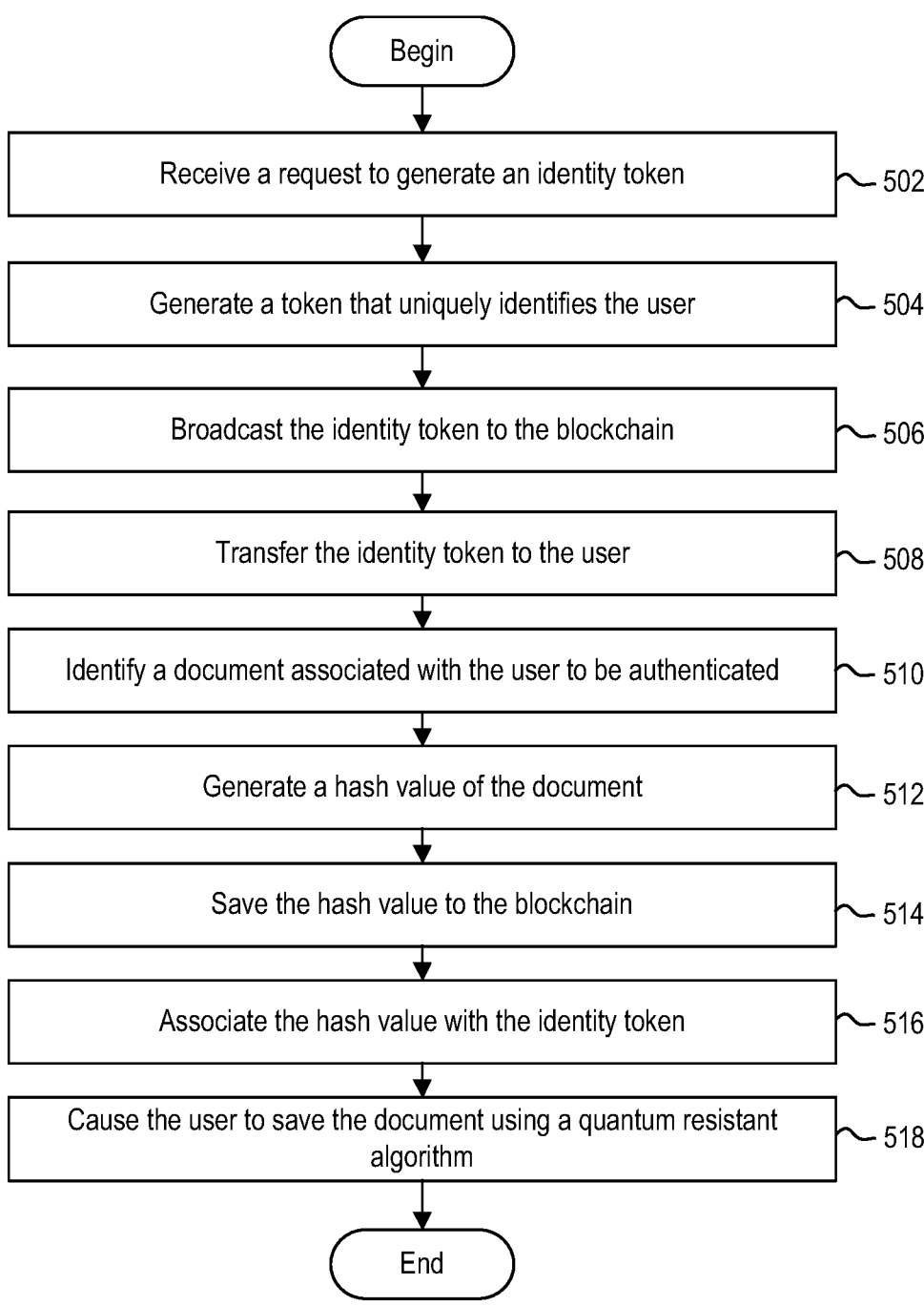
FIG. 5 is a flow diagram illustrating a method of authenticating a user, according to example embodiments.

FIG. 5 is a flow diagram illustrating a method 500 of authenticating a document for a user, according to example embodiments. Method 500 may begin at step 502.

At step 502, primary computing system 104 may receive a request from client device 102 to generate an identity token for a user of client device 102. For example, a user of client device 102 may request primary computing system 104 generate the identity token using application 110. In some embodiments, the identity token may uniquely identify the user. The user of client device 102 may use the identity token to prove to other entities that the user has been authenticated by primary computing system 104.

At step 504, primary computing system 104 may generate a token that uniquely identifies the user. For example, tokenization module 206 may generate a non-fungible token that may act as the user's identity token. In some embodiments, the identity token may take the form of an ERC-721 or ERC-1155 contract.

At step 506, primary computing system 104 may broadcast the identity token to blockchain 130. For example, broadcast module 208 may write or broadcast the non-fungible token to blockchain 130, thus creating an immutable record of the identity token.

At step 508, primary computing system 104 may transfer the identity token to the user. For example, once tokenization module 206 generate the identity token and it is broadcast to blockchain 130, the ownership of the identity token may be initially in control of primary computing system 104. As such, primary computing system 104 may initially store the user's identity token in wallet 120. Primary computing system 104 may then transfer the identity token to client device 102 through a transaction that may be written or broadcast to blockchain 130.

At step 510, primary computing system 104 may identify a document associated with the user to be authenticated. In some embodiments, the document may be uploaded by the user. For example, the document may be an item of personal identification information, such as, but not limited to, driver's license, passport, social security card, birth certificate, student identification, utility bill, and the like. In some embodiments, the document may be one that is maintained by primary computing system 104 and requested by the user. For example, the document may be a bank statement, a school transcript, loan documentation, a house deed, and the like.

At step 512, primary computing system 104 may generate a hash value of the document. For example, encryption module 310 may generate a hash of the document using public key 312. In some embodiments, encryption module 310 may generate a plurality of hash values for the document. For example, encryption module 310 may generate a first hash of the entire document and a plurality of second hashes of portions of the document.

At step 514, primary computing system 104 may store the hash value on blockchain 130. For example, once the hash value is generated, broadcast module 208 may broadcast the hash value to blockchain 130. Thus, in this manner, broadcast module 208 create an immutable record of the hash value generated encryption module 310.

At step 516, primary computing system 104 may associate the generated hash value with the identity token. For example, as part of the broadcasting operation, broadcast module 208 may link the hash value or the storage address of the hash value to the user's identity token.

At step 518, primary computing system 104 may cause the user to save the document using a quantum resistant algorithm. For example, primary computing system 104 may provide the document that was hashed to client device 102. As those skilled in the art understand, such step or process may assist the user with ensuring that the user has access to the version of the document that was used for creating the hash value, since any change to the document could result in a completely different hash value being generated using the same public key. In some embodiments, the user may store the document in an encrypted manner using a quantum resistant encryption algorithm.

Figure 6:
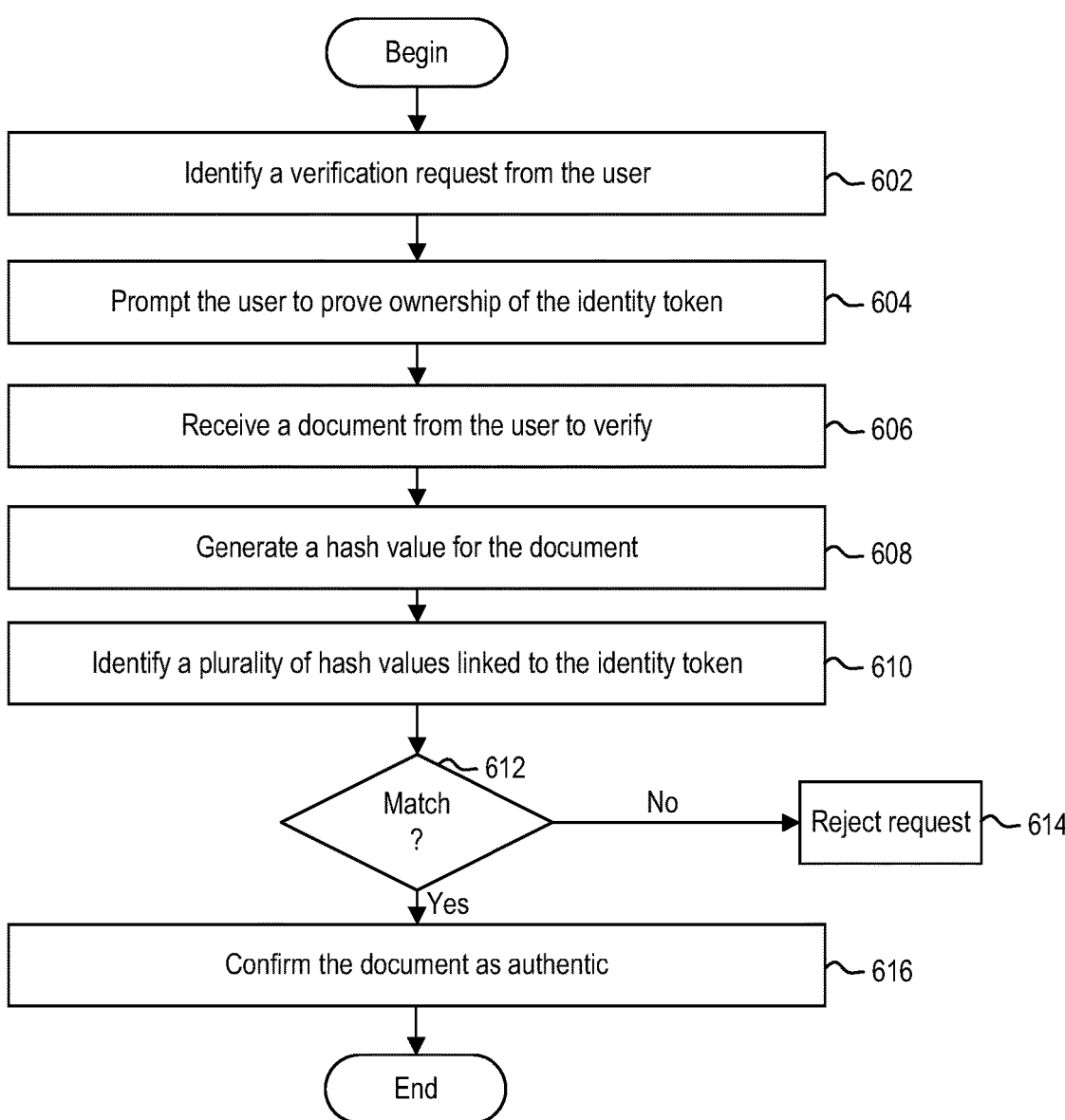
FIG. 6 is a flow diagram illustrating a method of verifying a document for a user, according to example embodiments.

FIG. 6 is a flow diagram illustrating a method 500 of verifying a document for a user, according to example embodiments. Method 600 may begin at step 602.

At step 602, secondary computing system 106 may identify a verification request from a user of client device 102. In some embodiments, the verification request may include an identity token.

At step 604, secondary computing system 106 may prompt the user to prove ownership of the identity token. For example, verification module 124 may prompt the user of client device 102 to verify that they own identity token 220. To prove to secondary computing system 106 that the user indeed owns identity token 220, the user may sign a transaction using identity token 220. Such process confirms to secondary computing system 106 that the user is associated with identity token 220.

At step 606, secondary computing system 106 may receive a document from the user to verify. In some embodiments, the document may be a document that may be stored on client device 102 using a quantum resistant algorithm. In some embodiments, the document received at secondary computing system 106 may be a decrypted version of that document.

At step 608, secondary computing system 106 may generate a hash value for the document. For example, verification module 124 may confirm that the document is authentic by generating a hash value or a plurality of hash values for the PII using public key 406. In some embodiments, public key 406 may be the same as public key 312 maintained by primary computing system 104.

At step 610, secondary computing system 106 may identify a plurality of hash values linked to the identity token. For example, as indicated above, a user's identity token may include a plurality of hash values linked thereto. The plurality of hash values may represent documents that have been previously verified or authenticated by primary computing system 104. When verification module 124 hashes the document using public key 406, verification module 124 should generate an output that matches at least one hash value linked to the user's identity token.

At step 612, secondary computing system 106 may compare the generated hash value to the plurality of hash values. If at step 612, secondary computing system 106 determines that the generated hash value does not match any of the plurality of hash values linked to the identity token, then method 600 may proceed at step 614. At step 614, secondary computing system 106 may reject the user's request.

If, however, at step 612, secondary computing system 106 determines that the generated hash value matches a hash value of the plurality of hash values, then method 600 proceeds to step 616. At step 616, secondary computing system 106 may confirm the document as authentic.

Figures 7A, 7B:
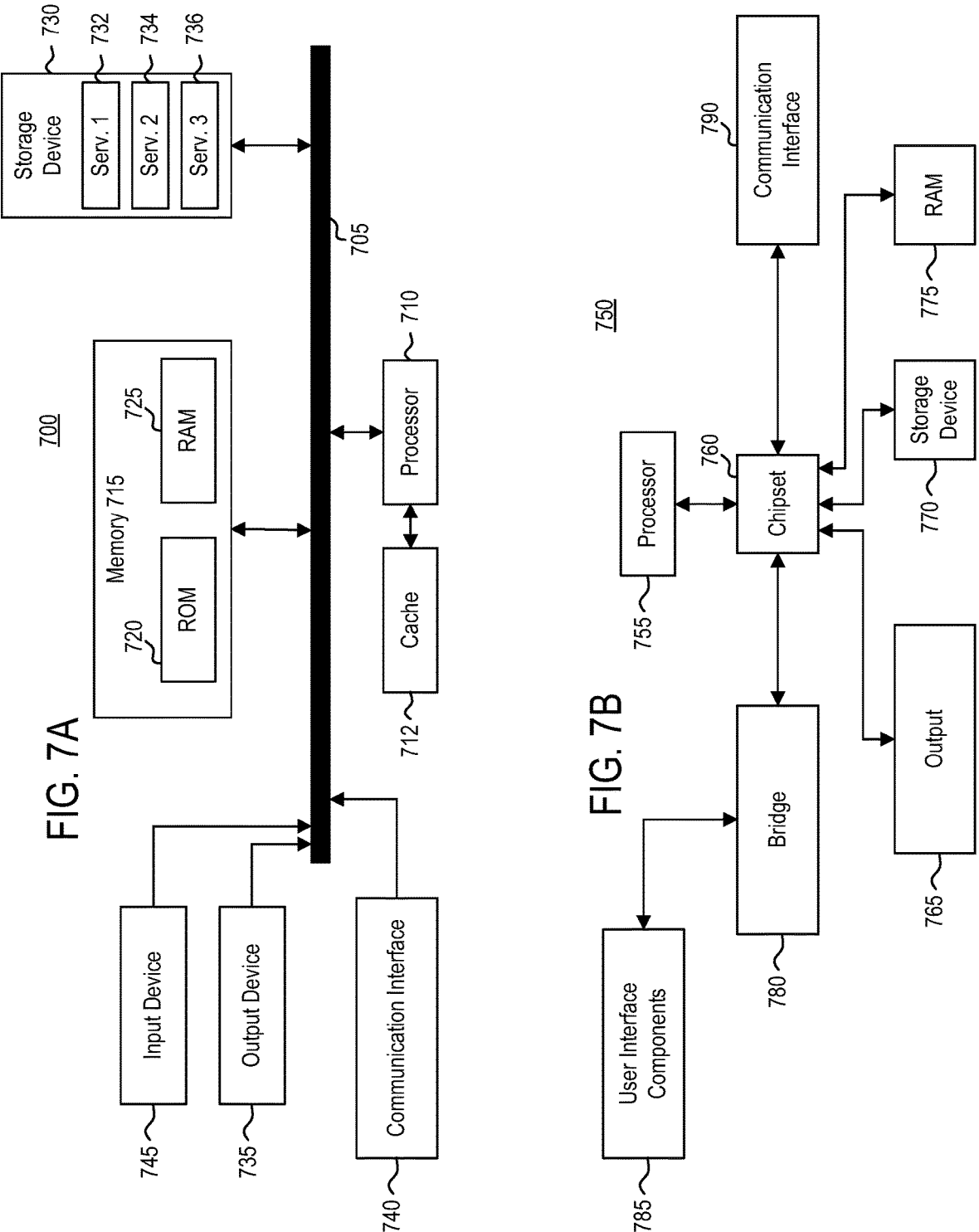
FIG. 7A illustrates a system bus computing system architecture, according to example embodiments.
FIG. 7B illustrates a computer system having a chipset architecture, according to example embodiments.

FIG. 7A illustrates an architecture of system bus computing system 700, according to example embodiments. One or more components of system 700 may be in electrical communication with each other using a bus 705. System 700 may include a processor (e.g., one or more CPUs, GPUs or other types of processors) 710 and a system bus 705 that couples various system components including the system memory 715, such as read only memory (ROM) 720 and random access memory (RAM) 725, to processor 710. System 700 can include a cache of high-speed memory connected directly with, in close proximity to, or integrated as part of processor 710. System 700 can copy data from memory 715 and/or storage device 730 to cache 712 for quick access by processor 710. In this way, cache 712 may provide a performance boost that avoids processor 710 delays while waiting for data. These and other modules can control or be configured to control processor 710 to perform various actions. Other system memory 715 may be available for use as well. Memory 715 may include multiple different types of memory with different performance characteristics. Processor 710 may be representative of a single processor or multiple processors. Processor 710 can include one or more of a general purpose processor or a hardware module or software module, such as service 1 732, service 2 734, and service 7 736 stored in storage device 730, configured to control processor 710, as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the system 700, an input device 745 which can be any number of input mechanisms, such as a microphone for speech, a touch-sensitive screen for gesture or graphical input, keyboard, mouse, motion input, speech and so forth. An output device 735 (e.g., a display) can also be one or more of a number of output mechanisms known to those of skill in the art. In some instances, multimodal systems can enable a user to provide multiple types of input to communicate with system 700. Communications interface 740 can generally govern and manage the user input and system output. There is no restriction on operating on any particular hardware arrangement and therefore the basic features here may easily be substituted for improved hardware or firmware arrangements as they are developed.

Storage device 730 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 can include services 732, 734, and 736 for controlling the processor 710. Other hardware or software modules are contemplated. Storage device 730 can be connected to system bus 705. In one aspect, a hardware module that performs a particular function can include the software component stored in a computer-readable medium in connection with the necessary hardware components, such as processor 710, bus 705, output device 735 (e.g., a display), and so forth, to carry out the function.

FIG. 7B illustrates a computer system 750 having a chipset architecture, according to example embodiments. Computer system 750 may be an example of computer hardware, software, and firmware that can be used to implement the disclosed technology. System 750 can include one or more processors 755, representative of any number of physically and/or logically distinct resources capable of executing software, firmware, and hardware configured to perform identified computations. One or more processors 755 can communicate with a chipset 760 that can control input to and output from one or more processors 755. In this example, chipset 760 outputs information to output 765, such as a display, and can read and write information to storage device 770, which can include magnetic media, and solid-state media, for example. Chipset 760 can also read data from and write data to storage device 775 (e.g., RAM). A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 755 analyzing data stored in storage device 770 or 775. Further, the machine can receive inputs from a user through user interface components 785 and execute appropriate functions, such as browsing functions by interpreting these inputs using one or more processors 755.

It can be appreciated that example systems 700 and 750 can have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of verifying a user, comprising:
   receiving, by a computing system, a request from a client device to verify a document associated with a user of the client device, wherein the request comprises an identity token of the user and the document to be verified;
   generating, by the computing system, a hash value corresponding to the document using a public key;
   identifying, by the computing system, a plurality of previously generated hash values linked to the identity token, wherein each of the plurality of previously generated hash values were generated using the public key by a second computing system distinct from the computing system;
   comparing, by the computing system, the generated hash value to the plurality of previously generated hash values;
   responsive to a prompt to prove ownership of the identity token, determining, by the computing system, that the user signed a transaction using the identity token,
   determining, by the computing system, that the generated hash value matches at least one of the previously generated hash values; and
   based on the determining, confirming, by the computing system, that the document is authentic.

2. The method of claim 1, wherein the document was previously stored on the client device in an encrypted form using a quantum resistant algorithm.

3. The method of claim 1, further comprising:
   populating, by the computing system, a form with values from the document.

4. The method of claim 1, further comprising:
   receiving, by the computing system, a second document from the client device to be verified;
   generating, by the computing system, a second hash value corresponding to the second document using the public key;
   comparing, by the computing system, the second hash value to the plurality of previously generated hash values;
   determining, by the computing system, that the second hash value does not match any of the plurality of previously generated hash values; and
   based on the determining, rejecting the second document.

5. The method of claim 1, wherein the plurality of previously generated hash values are included in metadata of the identity token.

6. A non-transitory computer readable medium comprising one or more sequences of instructions, which, when executed by a processor, causes a computing system to perform operations, comprising:
   receiving, by the computing system, a request from a client device to verify a document associated with a user of the client device, wherein the request comprises an identity token of the user and the document to be verified;
   generating, by the computing system, a hash value corresponding to the document using a public key;
   identifying, by the computing system, a plurality of previously generated hash values linked to the identity token, wherein each of the plurality of previously generated hash values were generated using the public key by a second computing system distinct from the computing system;
   comparing, by the computing system, the generated hash value to the plurality of previously generated hash values;
   responsive to a prompt to prove ownership of the identity token, determining, by the computing system, that the user signed a transaction using the identity token,
   determining, by the computing system, that the generated hash value matches at least one of the previously generated hash values; and
   based on the determining, confirming, by the computing system, that the document is authentic.

7. The non-transitory computer readable medium of claim 6, wherein the document was previously stored on the client device in an encrypted form using a quantum resistant algorithm.

8. The non-transitory computer readable medium of claim 6, further comprising: populating, by the computing system, a form with values from the document.

9. The non-transitory computer readable medium of claim 6, further comprising: receiving, by the computing system, a second document from the client device to be verified;

generating, by the computing system, a second hash value corresponding to the second document using the public key;

comparing, by the computing system, the second hash value to the plurality of previously generated hash values;

determining, by the computing system, that the second hash value does not match any of the plurality of previously generated hash values; and based on the determining, rejecting the second document.

10. The non-transitory computer readable medium of claim 6, wherein the plurality of previously generated hash values are included in metadata of the identity token.

11. A system comprising:

a processor; and a memory having programming instructions formed thereon, which, when executed by the processor, causes the system to perform operations comprising:

receiving a request from a client device to verify a document associated with a user of the client device, wherein the request comprises an identity token of the user and the document to be verified;

generating a hash value corresponding to the document using a public key;

identifying a plurality of previously generated hash values linked to the identity token, wherein each of the plurality of previously generated hash values were generated using the public key by a second computing system distinct from the computing system;

comparing the generated hash value to the plurality of previously generated hash values;

responsive to a prompt to prove ownership of the identity token, determining that the user signed a transaction using the identity token, determining that the generated hash value matches at least one of the previously generated hash values; and based on the determining, confirming that the document is authentic.

12. The system of claim 11, wherein the document was previously stored on the client device in an encrypted form using a quantum resistant algorithm.

13. The system of claim 11, wherein the operations further comprise: populating a form with values from the document.

14. The system of claim 11, wherein the operations further comprise: receiving a second document from the client device to be verified;

generating a second hash value corresponding to the second document using the public key;

comparing the second hash value to the plurality of previously generated hash values;

determining that the second hash value does not match any of the plurality of previously generated hash values; and based on the determining, rejecting the second document.

* * * * *